United States Patent
Bridgwater et al.

(10) Patent No.: US 9,388,352 B2
(45) Date of Patent: Jul. 12, 2016

(54) BIO-FUEL COMPOSITION AND METHOD FOR MANUFACTURE OF BIO-FUEL COMPOSITION

(75) Inventors: Anthony Victor Bridgwater, Solihull (GB); Mohammad Oroumieh, Qom (IR)

(73) Assignee: Aston University, Birmingham (GB)

( * ) Notice: Subject to any disclaimer, the term of this patent is extended or adjusted under 35 U.S.C. 154(b) by 764 days.

(21) Appl. No.: 13/704,323

(22) PCT Filed: Jun. 15, 2011

(86) PCT No.: PCT/GB2011/000901
§ 371 (c)(1),
(2), (4) Date: Dec. 31, 2012

(87) PCT Pub. No.: WO2011/157992
PCT Pub. Date: Dec. 22, 2011

(65) Prior Publication Data
US 2013/0118182 A1    May 16, 2013

(30) Foreign Application Priority Data

Jun. 16, 2010    (GB) .................................. 1010111.1

(51) Int. Cl.
*C10L 1/18* (2006.01)
*C10L 1/02* (2006.01)
(Continued)

(52) U.S. Cl.
CPC .................. *C10L 1/1802* (2013.01); *C10L 1/02* (2013.01); *C10L 1/026* (2013.01); *F02C 3/20* (2013.01); *F17C 9/02* (2013.01); *C10G 2300/1011* (2013.01); *F17C 2201/0109* (2013.01); *F17C 2201/032* (2013.01); *F17C 2201/056* (2013.01); *F17C 2221/013* (2013.01); *F17C 2223/0153* (2013.01); *F17C 2223/047* (2013.01); *F17C 2225/0123* (2013.01); *F17C 2225/0138* (2013.01); *F17C 2227/0311* (2013.01); *F17C 2227/0393* (2013.01);
(Continued)

(58) Field of Classification Search
CPC ......... C10L 1/1802; C10L 1/02; C10L 1/026; F17C 9/02; F17C 2201/0109; F02C 3/20; C10G 2300/1011; Y02E 50/13
See application file for complete search history.

(56) References Cited

U.S. PATENT DOCUMENTS 5,820,640 A   10/1998  Ikura et al.
2005/0120621 A1  6/2005  Lawson et al.
(Continued)

FOREIGN PATENT DOCUMENTS

CN          101892070 A    11/2010
WO    WO 2008/020167 A2     2/2008
WO    WO 2010/099058 A2     9/2010

OTHER PUBLICATIONS

International Search Report and Written Opinion from International Application No. PCT/GB2011/000901, dated Aug. 12, 2011.
(Continued)

*Primary Examiner* — Cephia D Toomer
(74) *Attorney, Agent, or Firm* — Alston & Bird LLP (57) ABSTRACT

The invention relates to a liquid bio-fuel mixture, and uses thereof in the generation of electrical power, mechanical power and/or heat. The liquid bio-fuel mixture is macroscopically single phase, and comprises a liquid condensate product of biomass fast pyrolysis, a bio-diesel component and an ethanol component.

15 Claims, 6 Drawing Sheets

(51) Int. Cl.
  *F17C 9/02*  (2006.01)
  *F02C 3/20*  (2006.01)
(52) U.S. Cl.
  CPC ........ *F17C 2227/0397* (2013.01); *Y02E 50/13* (2013.01); *Y02P 30/20* (2015.11)

(56) References Cited

U.S. PATENT DOCUMENTS

| | | |
|---|---|---|
| 2007/0261296 A1 | 11/2007 | Adams et al. |
| 2009/0139137 A1 | 6/2009 | Ikura et al. |
| 2009/0227766 A1 | 9/2009 | Bridgwater et al. |
| 2010/0170147 A1 | 7/2010 | McNeff et al. |
| 2012/0167451 A1* | 7/2012 | Festuccia ............ C10L 1/02 44/307 |

OTHER PUBLICATIONS

Czernik, S.; "Overview of Applications of Biomass Fast Pyrolysis Oil"; *Energy & Fuels*; 2004, vol. 18, pp. 590-598.

Bridgwater, A.V., et al., *An Overview of Fast Pyrolysis of Biomass*, Organic Geochemistry, vol. 30, Issue 12 (1999) pp. 1479-1493.

Bridgwater, A.V., *Renewable Fuels and Chemicals by Thermal Processing of Biomass*, Chemical Engineering Journal, vol. 91, Issues 2-3 (2003) pp. 87-102.

Bridgwater, A.V., *Biomass Fast Pyrolysis*, Thermal Science, vol. 8, No. 2 (2004) pp. 21-49.

Garcia-Perez, M., et al., *Production and Fuel Properties of Pine Chip Bio-oil/Biodiesel Blends*, Energy and Fuels, vol. 21 (2007) pp. 2363-2372.

Jiang, X., et al., *Upgrading Bio-oil through Emulsification with Biodiesel: Mixture Production*, Energy and Fuels, vol. 24, No. 2 (2010) pp. 1358-1364.

Mohan, D., et al., *Pyrolysis of Wood/Biomass for Bio-oil: A Critical Review*, Energy and Fuels vol. 20. (2006) pp. 848-889.

Weerachanchai, P., et al., *Phase Behaviors and Fuel Properties of Bio-Oil-Diesel-Alcohol Blends*, World Academy of Science, Engineering and Technology, vol. 56 (2009) pp. 387-393.

* cited by examiner

BIO-FUEL COMPOSITION AND METHOD FOR MANUFACTURE OF BIO-FUEL COMPOSITION

This application is the U.S. National Stage Application of International (PCT) Patent Application Serial No. PCT/GB2011/000901, filed Jun. 15, 2011, which claims the benefit of GB Application No. 1010111.1, filed Jun. 16, 2010. The entire disclosures of these two applications are hereby incorporated by reference as if recited herein in their entirety.

BACKGROUND TO THE INVENTION

1. Field of the Invention

The present invention relates to bio-fuel compositions, uses thereof and methods for the manufacture of bio-fuel compositions. The present invention has particular application to the formation of blends of bio-fuels, such as bio-oil, bio-diesel and ethanol.

2. Related Art

Biomass pyrolysis is the thermal decomposition of biomass (e.g. plant material such as wood and wood bark) substantially in the absence of oxygen. Biomass is typically a mixture of hemicellulose, cellulose, lignin and small amounts of other organics. These components typically pyrolyse or degrade at different rates and at different temperatures and by different mechanisms and pathways.

One traditional example of biomass pyrolysis is the production of charcoal, where the main product of the pyrolysis is char. Alternative biomass pyrolysis techniques provide a product which, after cooling, includes a substantial proportion of liquid. This liquid is typically a dark brown liquid having a heating value that is around one half the heating value of conventional fuel oil. The liquid is typically referred to as bio-oil. In many circumstances, it is the bio-oil which is the most valuable product of the pyrolysis reaction, since bio-oil can be easily stored for later use, e.g. for heat and/or electricity generation. Bio-oil typically is a homogenous hydrophilic mixture of polar organics and water.

The rate and extent of decomposition of the components of biomass depends on the process parameters of the pyrolysis reactor, e.g. the rate of heating of the biomass, the mode of heating of the biomass and the residence time of the subsequent products. In turn, these process parameters may also have an effect on the subsequent behaviour of the product, e.g. by secondary reactions such as cracking (of higher molecular mass products) or condensation reactions (of lower molecular mass products).

Biomass pyrolysis can be carried out using fast heating rates and short hot vapour residence times. Such "fast" pyrolysis processes are reviewed by Bridgwater et al (A. V. Bridgwater, D. Meier and D. Radlein, "An overview of fast pyrolysis of biomass" Organic Geochemistry Volume 30, Issue 12, December 1999, Pages 1479-1493). It is considered in that disclosure that optimum levels of organics in the bio-oil may be achieved by fast heating of the biomass to a reaction temperature of around 500° C. and hot vapour residence times of less than around 1 second.

There are several different options for achieving heating of the biomass in a fast pyrolysis reactor. For example, ablative pyrolysis requires the biomass particles to be pressed against a heated surface and rapidly moved. This allows the use of relatively large biomass particles. Alternatively, fluid bed and circulating fluid bed pyrolysis reactors transfer heat from a heat source to the biomass particles by a mixture of convection and conduction. Since heat transfer must typically occur quickly, fluid bed pyrolysis reactor require the use of small biomass particles, e.g. not more than 3 mm. A further alternative is vacuum pyrolysis, in which heating rates may be relatively low, but the application of a vacuum quickly extracts the pyrolysis products and thus simulates some effects of fast pyrolysis.

Further, more recent, reviews of biomass pyrolysis have been conducted by A. V. Bridgwater ("Renewable fuels and chemicals by thermal processing of biomass" Chemical Engineering Journal Volume 91, Issues 2-3, 15 Mar. 2003, pages 87-102; and "Biomass fast pyrolysis", Thermal Science Vol. 8 (2004), No. 2, pages 21-49).

It is known that the quality of bio-oil can be improved by the addition of ethanol. For example, in WO 2008/020167, it is disclosed that ethanol can act as a phase separation suppression agent for bio-oil. The problem addressed in WO 2008/020167 is that bio-oil tends to suffer from phase separation. Bio-oil is a complex mixture primarily of water, hydrophilic oxygenated organic compounds and higher molecular weight lignin fragments. It is considered that a water content above a certain level, e.g. 30-40% by mass can lead to phase separation of the bio-oil into two phases, an aqueous phase dominated by water and small hydrophilic organic compounds and an organic phase which contains most of the phenolic lignin-derived fragments. This phase separation is undesirable, since separate phases can be more difficult to handle and utilise than a single phase bio-oil.

Weerachanchai et al (2009) [P. Weerachanchai et al, "Phase behaviors and fuel properties of bio-oil-diesel-alcohol blends" World Academy of Science, Engineering and Technology 56 (2009) p. 387] disclose the results of work on attempts to blend slow pyrolysis palm kernel bio-oil with diesel fuel and alcohols. Slow pyrolysis liquids are invariably phase separated into an aqueous phase with soluble organic compounds such as acetic acid and an organic phase that contains a limited amount of water and water soluble organic compounds. The organic phase is usually higher viscosity and results from more extensive cracking of the pyrolysis products. Weerachanchai et al (2009) explains that it is known to mix diesel fuel with methanol and/or ethanol at up to 20% methanol/ethanol. In the experimental discussion in Weerachanchai et al (2009), it is explained that palm kernel bio-oil is obtained by slow pyrolysis of palm kernel cake at 700° C. The resultant bio-oil has two separated phases: an aqueous phase and an oily phase. The diesel used is a commercial petrodiesel fuel, i.e. a hydrocarbon. It was found that the solubility of petrodiesel in ethanol/bio-oil mixtures was only possible at room temperature up to a maximum of about 10% petrodiesel (in ethanol-rich ethanol/bio-oil mixtures). However, it will be appreciated that information about the miscibility of petrodiesel does not provide useful information about the corresponding miscibility of bio-diesel, in view of the very significant chemical differences between these compositions.

Garcia-Perez et al (2007) [M. Garcia-Perez et al "Production and Fuel Properties of Pine Chip Bio-oil/Biodiesel Blends" Energy & Fuels 2007, 21, 2363-2372] disclose the results of work on blending bio-oil with bio-diesel. The bio-oil was produced by slow pyrolysis of pine chips and pine pellets, resulting in a product with two separated phases: an oily bottom phase and an aqueous phase. Garcia-Perez et al (2007) disclose that the oily bottom phase is more soluble in bio-diesel than the aqueous phase. These workers aimed to check the solubility of the different bio-oil phases in bio-diesel by heating mixtures of bio-oil and bio-diesel to 60° C. and shaking. The mixtures were allowed to cool to room temperature. The oily bottom phase of the bio-oil mixed in a single phase with bio-diesel at up to 34 wt % of the oily bottom phase of the bio-oil. The aqueous phase of the bio-oil was essentially immiscible with bio-diesel. This disclosure demonstrates therefore that achieving any miscibility between all of the components of a bio-oil and bio-diesel poses a serious technical challenge.

SUMMARY OF THE INVENTION

The present inventors have devised the present invention in order to address, avoid, reduce and/or solve one or more of the above problems.

Accordingly, in a first preferred aspect, the present invention provides a liquid bio-fuel mixture comprising:
  a liquid condensate product of biomass fast pyrolysis
  a bio-diesel component
  an ethanol component
wherein the liquid bio-fuel mixture is macroscopically single phase.

Preferably, the mixture is macroscopically single phase at room temperature (e.g. 20-25° C.).

Preferably, where:
  the liquid condensate product of biomass fast pyrolysis is represented as BO, the wt % of BO being x;
  the bio-diesel is represented as BD, the wt % of BD being y; and
  the ethanol component is represented as EtOH, the wt % of EtOH being z,
the composition of the mixture thereby is representable as (BO)x(BD)y(EtOH)z, wherein on a ternary phase diagram having three axes, each axis defining respectively the wt % of BO, BD, and EtOH, a macroscopic single phase region of the phase diagram is enclosed at least by a polygon having vertices defined by values for (x, y, z) of:
(0, 15, 85), (5, 57, 38), (8, 46, 46), (13, 35, 52), (20, 24, 56), (30, 12, 58), (40, 7, 53), (50, 5, 45), (60, 4, 36), (95, 1, 4), and (0, 1, 99).

Preferably, a macroscopic single phase region of the phase diagram is enclosed at least by a polygon having vertices defined by values for (x, y, z) of:
(5, 57, 38), (8, 46, 46), (13, 35, 52), (20, 24, 56), (30, 12, 58), (40, 7, 53), (50, 5, 45), (60, 4, 36), and (5, 3, 92).

Preferably, a macroscopic single phase region of the phase diagram is enclosed at least by a polygon having vertices defined by values for (x, y, z) of:
(8, 46, 46), (13, 35, 52), (20, 24, 56), (30, 12, 58), (40, 7, 53), (50, 5, 45), (60, 4, 36), and (8, 6, 86).

Preferably, the mixture contains at least 10 wt % of the liquid condensate product of biomass fast pyrolysis (i.e. bio-oil). More preferably, the mixture contains at least 15 wt % of the liquid condensate product of biomass fast pyrolysis.

Preferably, a macroscopic single phase region of the phase diagram is enclosed at least by a polygon having vertices defined by values for (x, y, z) of:
(10, 50, 50), (20, 20, 60) and (10, 10, 80).

Preferably, the liquid condensate product of biomass pyrolysis is itself macroscopically single phase. However, it is in some embodiments possible for the liquid condensate product of biomass pyrolysis to be multi phase, e.g. to have two (or optionally more) phases, typically an oily phase and a separate aqueous phase.

Preferably, the liquid condensate product of biomass pyrolysis contains at least 10 wt % (more preferably at least 15 wt %) water. Furthermore, preferably the liquid condensate product of biomass pyrolysis contains at most 40 wt % water.

In some embodiments, the liquid bio-fuel mixture may further comprise at least 5 wt % petrodiesel.

In a second preferred aspect, the present invention provides a use of a liquid bio-fuel mixture according to the first aspect in a combustion process for the generation of electrical power.

In a third preferred aspect, the present invention provides a use of a liquid bio-fuel mixture according to the first aspect in a combustion process for the generation of mechanical power.

In a fourth preferred aspect, the present invention provides a use of a liquid bio-fuel mixture according to the first aspect in a combustion process for the generation of heat.

Any of the preferred or optional features of any aspect may be combined, either singly or in any combination, with any other aspect, unless the context demands otherwise.

DETAILED DESCRIPTION OF THE PREFERRED EMBODIMENT, AND FURTHER OPTIONAL FEATURES OF THE INVENTION

Bio-oil produced from fast pyrolysis of biomass can be defined as the liquid condensate recovered by thermal treatment of lignocellulosic biomass at short hot vapour residence time (typically less than about 5 seconds) typically at between 450-600° C. at near atmospheric pressure or below, substantially in the absence of oxygen, using small (typically less than 5 mm) dry (typically less than 10% water) biomass particles.

Various engineering solutions can be utilised in order to effect high heat transfer into the biomass particle and fast quenching of the vapour product, usually after removal of solid by-product (char and optionally ash), to recover a single phase liquid product.

Bio-oil is a complex mixture of, for the most part, oxygenated hydrocarbon fragments derived from the biopolymer structures. It typically contains 15-30% water. Common organic components include acetic acid, methanol, aldehydes and ketones, cyclopentenones, furans, alkyl-phenols, alkyl-methoxy-phenols, anhydrosugars, and oligomeric sugars and water-insoluble lignin-derived compounds. Nitrogen- and sulfur-containing compounds are also sometimes found depending on the biomass source.

The term "biodiesel" includes the fatty acid methyl ester of vegetable oil and methanol. The term also includes raw vegetable oils, animal oils and fats and methyl and ethyl esters of any vegetable oil or animal derived oil and fat.

The term "ethanol" is of course well understood. Large scale ethanol production is based on the fermentation of biomass or synthesis from fossil fuels.

The term "single phase" in the context of this technical field in reference to the bio-fuel is a macroscopic consideration, and means that the bio-fuel is not bi-phasic or multi-phase. However, macroscopically homogenous liquids are intended to be included. As such, micro-emulsions, sols and colloids are encompassed within the meaning of the term "single phase". Thus, the bio-fuel does not have two or more distinct and separate phases, even though, at below the microscopic level, more than one phase may be present. However, in the most preferred embodiments, only a single phase is present even at and below the microscopic level.

In the work carried out by the present inventors, the miscibility of bio-oil, bio-diesel and ethanol has been investigated.

Bio-diesel and ethanol are known for use in internal combustion engines. Bio-oil has typically not been used as a transportation fuel. Bio-oil and bio-diesel are typically considered to be immiscible. However, as shown by the work reported below, ethanol can effect their miscibility. As will be understood, since bio-oil is relatively cheap to produce, if blends of bio-oil and bio-diesel can be made, then this will increase the range of uses of bio-oil in new applications.

The water content of biodiesel is typically about 1 wt %. However, the water content of bio-oil is typically about 25-35 wt %. The present investigations have studied properties of mixtures of bio-oil, bio-diesel and ethanol based on parameters such as pH, water content, density and refractive index.

Methodology and Techniques

Bio-oil and bio-diesel are not miscible together even at low concentrations. However, as discussed in more detail, when ethanol is added to a mixture of them, there are seen different effects. Accordingly, different ratios of bio-oil, bio-diesel and ethanol were prepared and the samples were tested by various test methods.

Materials

Bio-oil was produced by fast pyrolysis of mixed wood using 1 kg/h fluid bed reactor. The temperature was 500° C. using nitrogen as the fluidizing gas and silica sand as the fluidizing medium in the bio-energy laboratory at Aston University, United Kingdom.

Biodiesel was produced from vegetable oil by Biofuels Northern Ireland. 100 g of this product has the following properties:

Energy value 500 kcal fat 100 g (polyunsaturated fat 39 g, monounsaturated fat 62 g, saturated fat 2 g)

The ethanol used in this work is laboratory reagent grade produced by Fischer Scientific Co.

Mixing Method

A bio-oil and bio-diesel blend 50%/50% (w/w %) was mixed with different proportions of ethanol. The resultant mixture divides into two parts, at room temperature and at 50° C.

In a different test, 50% (w %) ethanol was blended with different proportions of bio-oil and biodiesel.

In the step of blending bio-oil and bio-diesel, the total weight for each sample was 20 grams. Tables 1 and 3 show percentage for each sample. In addition, Tables 2 and 4 show the weight of each material that used to provide the samples.

In the first test, the ratio of bio-oil to biodiesel was the same. In the second test, the ratio of ethanol is fixed and the ratio of bio-oil and bio-diesel was varied.

The raw materials may be blended at room temperature. The blended raw materials may be heated to 50° C. for about 30 minutes.

When bio-oil and bio-diesel are blended, a two phase liquid is formed. The bio-diesel formed the top phase and the bio-oil forms the bottom phase.

TABLE 1 the percentage of bio-oil and biodiesel

| | Bio-oil/Bio-diesel (50/50%) | Ethanol |
|---|---|---|
| 1 | 20% | 80% |
| 2 | 40% | 60% |
| 3 | 60% | 40% |
| 4 | 80% | 20% |

TABLE 2 the weight of bio-oil, biodiesel and ethanol

| | Bio-oil (g) | Biodiesel (g) | Ethanol (g) | Total weight (g) |
|---|---|---|---|---|
| 1 | 2 | 2 | 16 | 20 |
| 2 | 4 | 4 | 12 | 20 |
| 3 | 6 | 6 | 8 | 20 |
| 4 | 8 | 8 | 4 | 20 |

After mixing, ethanol added to mix of bio-oil and biodiesel with different ratio as shown in Tables 3-3 and 3-4.

TABLE 3 the percentage of bio-oil and biodiesel with fixed amount of ethanol

| | (Bio-oil/Bio-diesel) | Ethanol |
|---|---|---|
| 1 | (80%/20%) | 50% |
| 2 | (40%/60%) | 50% |
| 3 | (60%/40%) | 50% |
| 4 | (20%/80%) | 50% |

TABLE 4 weight of bio-oil, biodiesel and ethanol

| | Bio-oil (g) | Bio-diesel (g) | Ethanol (g) | Total weight (g) |
|---|---|---|---|---|
| 1 | 8 | 2 | 10 | 20 |
| 2 | 6 | 4 | 10 | 20 |
| 3 | 4 | 6 | 10 | 20 |
| 4 | 2 | 8 | 10 | 20 |

Thus, four samples are provided, with different properties. Next, various parameters are measured (or calculated) for each sample, namely water content, PH, density, refractive index. It was also an aim to identify the amount of bio-oil components which dissolve in bio-diesel and the effect of ethanol on miscibility of bio-oil and bio-diesel.

Analytical Methods

Density

In the present work, the density of the samples was measured by a traditional method. Some samples were homogenous liquid, but some samples were two phases of bio-oil and bio-diesel.

First, an empty vial was weighed. Next, 5 ml of the sample was placed in the vial by syringe. Next, the vial and sample inside the vial were weighed again, and the density of the sample calculated.

GC-MS (Gas Chromatography-Mass Spectrometry)

A Perkin-Elmer Auto system XL gas chromatograph fitted with a DB 1701 column (60 m×25 μm with 0.25 μm film thicknesses) was used to separate 1 μl of injected liquids with a split ratio of 1:25. The oven program held temperature at 45° C. for 4 minutes then heated to 240° C. at a rate of 4° C. min$^{-1}$. The injection and detector temperatures were set at 280° C. Electron impact mass spectra were obtained by Perkin-Elmer MS GOLD (UK) at 70 eV. The mass range from m/z 28 to 300 was scanned with a speed of 1 s/decade. Data processing was performed using NIST-98 Mass Spectral library.

After mixing, sample numbers 1 and 2 form homogenous liquids. Samples number 3 and 4 form two phase liquids. Most of the top layer in the two-phase liquids comprises biodiesel and ethanol with a small amount of bio-oil. The bottom layer is mostly bio-oil and ethanol.

Identifying the components and amount of each component is measurable with GC-MS. Using a syringe, about 1 ml of rich bio-oil, biodiesel and each layers of samples is extracted. 2 or 3 drops of these liquids are input into separate vial. These have added to them about 10 to 15 drops of ethanol (GC grade). The samples are then injected into the GC-MS equipment for analysis.

The results (not shown) appear as peaks corresponding to the components in the sample.

Karl-Fischer for Water Content Determination

The water content was measured using the equipment of a 758 KFD titration Metrohm. The equipment was first calibrated with distilled water. The amount of water in a syringe was determined by weighing. Next, 2 or 3 drops of water were injected into liquid which is set in the equipment. The syringe and water were again weighed, to determine the amount of water in the liquid in the equipment.

pH Meter pH was measured using pH meter model PB-11 Sartorius. The pH meter was first calibrated using buffers, as follows. The electrode was washed using distilled water and dried. Next, the electrodes were placed in buffer (pH=4, 7), to check the measurement against the known pH of each buffer.

Refractive Index

The refractive index was measured by GPR 11-37-X. This refractometer includes a water bath and refractive index equipment. The water bath was adjusted to a temperature of 25° C. When the temperature was stable, some drops of water were placed on the special area on the refractometer and the door closed, and the refractometer was thereby calibrated.

Photographs

Photographs (not shown) were taken of each sample using backlighting and with a white background at room temperature, in order to assess whether each sample is a macroscopic single phase.

Results and Discussion

Photography: Bio-Oil, Biodiesel and Ethanol Blended at 25° C. and 50° C.

Photos were taken of the raw materials, and the result can be described as follows. The bio-oil was very dark and opaque. The bio-diesel was a light yellow colour and transparent. The ethanol was clear and transparent.

The mixture of bio-oil 10%/bio-diesel 10%/ethanol 80% was a dark but homogeneous liquid.

The mixture of bio-oil 20%/bio-diesel 20%/ethanol 60% was a dark but homogeneous liquid.

The mixture of bio-oil 30%/bio-diesel 30%/ethanol 40% was a two phase liquid.

The mixture of bio-oil 40%/bio-diesel 40%/ethanol 20% was a two phase liquid.

All the samples reported here have a mass of 20 g and were mixed at 25° C. When identical samples were mixed at 50° C., no difference in the miscibility was seen.

Photography: Bio-Oil, Biodiesel and Fixed Ratio of Ethanol Blended at 25° C. and 50° C.

Photos were taken of the raw materials, and the result can be described as follows. The bio-oil was very dark and opaque. The bio-diesel was a light yellow colour and transparent. The ethanol was clear and transparent.

Further photos were taken of the samples prepared using different ratios of bio-oil and biodiesel with 50% ethanol.

The mixture of bio-oil 10%/bio-diesel 40%/ethanol 50% was a dark but homogeneous liquid.

The mixture of bio-oil 20%/bio-diesel 30%/ethanol 50% was a two phase liquid.

The mixture of bio-oil 30%/bio-diesel 20%/ethanol 50% was a two phase liquid.

The mixture of bio-oil 40%/bio-diesel 10%/ethanol 50% was a two phase liquid.

All the samples reported here have a mass of 20 g and were mixed at 25° C. When identical samples were mixed at 50° C., no difference in the miscibility was seen.

Ternary Phase Diagram

Figure 1:
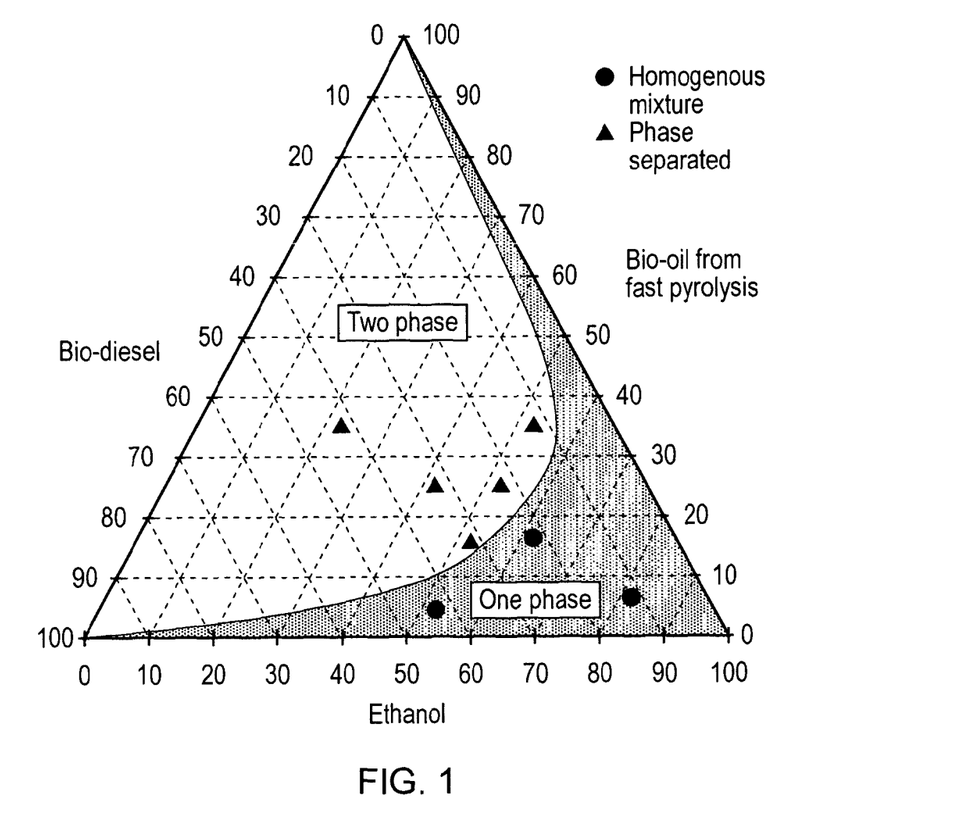
FIG. 1 shows a ternary phase diagram for the bio-oil-bio-diesel-ethanol system.

FIG. 1 shows a ternary phase diagram for the bio-oil-biodiesel-ethanol system. Circular data points indicate a homogeneous mixture and triangular data points indicate a phase separated mixture. The estimated one-phase and two-phase boundary is drawn on the ternary phase diagram.

It is emphasised here that the phase diagram illustrated is an example of suitable combinations of specific components. The skilled person will understand, based on the disclosure herein, that other specific components (each falling within the respective definitions of the components used here), when mixed, may have slightly different miscibility properties, leading to differences in the resultant ternary phase diagram. It is considered that, for the first time, the present disclosure shows that it is possible to mix the components in commercially significant proportions and yet still achieve a blend which is macroscopically single phase. Therefore it is preferred that the scope of the present invention is not necessarily limited strictly to the shape of the ternary phase diagram illustrated.

pH Measurements

Single Components

The pH of the individual components was measured. The pH of bio-oil was measured to be 2.64. It was not possible to measure the pH of the bio-diesel or ethanol in view of the very low water concentrations in these liquids.

Blend of Bio-Oil, Bio-Diesel and Ethanol with Different Ratios of Ethanol

After blending same percent of bio-oil and biodiesel with different percent of ethanol, the pH measured for each sample in different temperature condition. Tables 5 and 6 below show the results for different samples.

TABLE 5

| (bio-oil 50%/bio-diesel 50%)/EtOH % at T = 25° C. | | | |
|---|---|---|---|
| | pH | | |
| Ratio (w/w %) | One phase | Top layer | Bottom layer |
| 20/80 | 5.08 | — | — |
| 40/60 | 4.7 | — | — |
| 60/40 | — | 3.8 | 4.21 |
| 80/20 | — | 3.5 | 3.67 |

TABLE 6

(bio-oil 50%/bio-diesel 50%)/EtOH % at T = 50° C.

| | pH | | |
|---|---|---|---|
| Ratio (w/w %) | One phase | Top layer | Bottom layer |
| 20/80 | 5.2 | — | — |
| 40/60 | 4.72 | — | — |
| 60/40 | — | 3.97 | 4.33 |
| 80/20 | — | 3.31 | 3.68 |

The results show that there is no significant difference in pH for corresponding samples at the two different mixing temperatures.

The samples are homogeneous liquids when in ratios of 20/80 and 40/60 (w/w %). The pH of these liquids is less than 7, typically about 4-5. It is clear that after, the pH increased and the amount of ethanol had a direct effect on the pH.

In the other ratios, the samples are two phase liquids. In top layer, the major component is bio-diesel. In both ratios, 60/40 and 80/20 (w/w %), pH in the top layer is less than that of the bottom layer. In 20% of ethanol, the pH of the top and bottom layer become closer. This may be the effect of the amount of ethanol. The proportion of bio-oil and bio-diesel is the same and bio-oil and biodiesel are not miscible. However, the ethanol dissolves in both of bio-oil and biodiesel. So, the proportion of ethanol has direct effect on pH in all samples.

Figure 2:
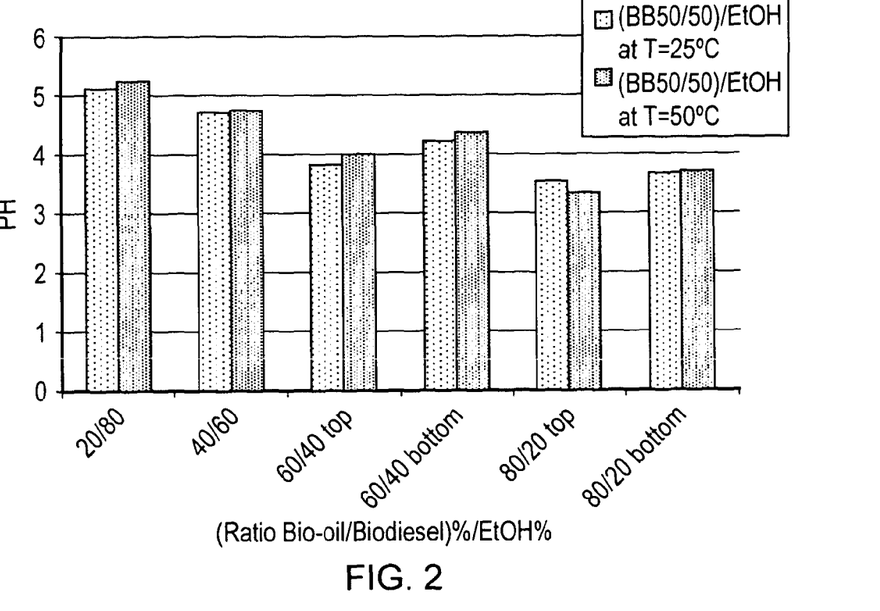
FIGS. 2 and 3 show the pH for various samples, comparing different temperature and ratios of starting materials.

When the amount of ethanol is reduced, the pH in both layers reduces. FIG. 2 show the pH for the relevant samples, comparing different temperature and ratios.

Blend of Bio-Oil, Bio-Diesel with 50% of Ethanol

As above, there were four samples with different ratios of starting materials. The samples were produced at 25° C. and 50° C., as explained above. However, only one of these samples is a homogenous liquid. The ratio of 10% bio-oil, 40% bio-diesel and 50% ethanol provides a homogenous liquid. The other samples provided two phases liquids. Tables 7 and 8 show the pH for each sample and each layer.

TABLE 7

(bio-oil/bio-diesel)/EtOH % 50% at T = 25° C.

| | pH | | |
|---|---|---|---|
| Ratio (w/w %) | One phase | Top layer | Bottom layer |
| 10/40 | 4.98 | — | — |
| 20/30 | — | 4.62 | 4.62 |
| 30/20 | — | 4.27 | 4.46 |
| 40/10 | — | 4.08 | 4.28 |

TABLE 8

(bio-oil/bio-diesel)/EtOH % 50% at T = 50° C.

| | pH | | |
|---|---|---|---|
| Ratio (w/w %) | One phase | Top layer | Bottom layer |
| 10/40 | 4.86 | — | — |
| 20/30 | — | 4.48 | 4.52 |
| 30/20 | — | 4.19 | 4.28 |
| 40/10 | — | 4.01 | 4.21 |

The results show there is no significant difference between the pH of the various samples. In these samples the proportion of ethanol is constant.

Figure 3:
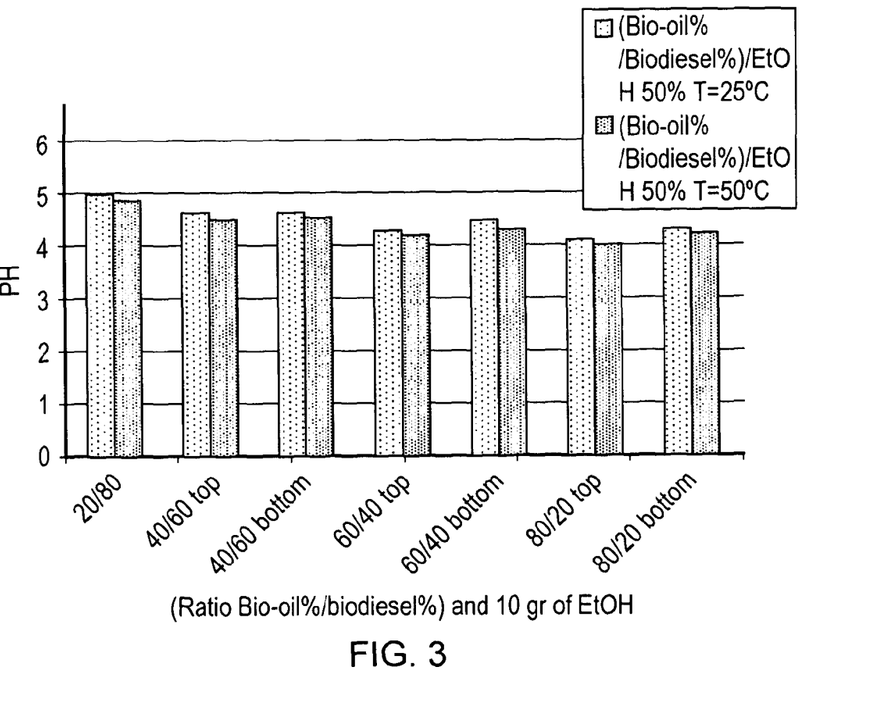

FIG. 3 shows the pH for the relevant samples, comparing different temperature and ratios.

Water Content
Single Components

Water content is an important factor in the performance of the bio-fuel. This parameter measured by Karl Fischer titration.

First of all, the water content of the starting materials is measured. The results have shown in Table 9.

TABLE 9

Water content of starting materials

| Sample | WCP |
|---|---|
| Bio-oil | 33.31 |
| Bio-diesel | 0.18 |
| Ethanol | 0.23 |

The water content was measured three times for each sample. The result shown in Table 9 is the average. After mixing the samples, the same method was used to calculate the water content. The average of each sample reported as result.

Blend of Bio-Oil, Bio-Diesel and Ethanol with Different Ratio of Ethanol

The water content was measured for four samples. Two samples were single phase and other two samples were two phases. The water content measured for both layers.

TABLE 10

(bio-oil 50%/bio-diesel 50%)/EtOH % at T = 25° C.

| | Water content % | | |
|---|---|---|---|
| Ratio (w/w %) | One phase | Top layer | Bottom layer |
| 20/80 | 3.25 | — | — |
| 40/60 | 6.60 | — | — |
| 60/40 | — | 1.51 | 13.32 |
| 80/20 | — | 0.96 | 22.19 |

TABLE 11

(bio-oil 50%/bio-diesel 50%)/EtOH % at T = 50° C.

| | Water content % | | |
|---|---|---|---|
| Ratio (w/w %) | One phase | Top layer | Bottom layer |
| 20/80 | 3.44 | — | — |
| 40/60 | 6.50 | — | — |
| 60/40 | — | 1.56 | 13.49 |
| 80/20 | — | 0.86 | 22 |

Tables 9 and 10 show that the water content for two temperature conditions is approximately the same. At the ratio of 20/80 and 40/60 (w/w %), the water content is about 3% and 6.5%. It is clear when the amount of bio-oil increases, the water content increases. When the ratio of bio-oil increases by a factor of two, so the water content increases by about a factor of two.

There are water content results for each phase of the samples with two phases. The major component for the top layer is bio-diesel and just small amount of bio-oil dissolves in bio-diesel. The bio-oil changes the amount of water in the top layer. The results for top layer in ratios of 60/40 and 80/20 [(bio-oil 50%/bio-diesel 50%)/EtOH %] (w/w %) are more than for the biodiesel starting material. It is clear that the ethanol increases miscibility of bio-oil in bio-diesel. When the ratio of ethanol reduces, the water content reduces. This occurs for all samples and phases.

The temperature does not have a significant effect on the water content.

Figure 4:
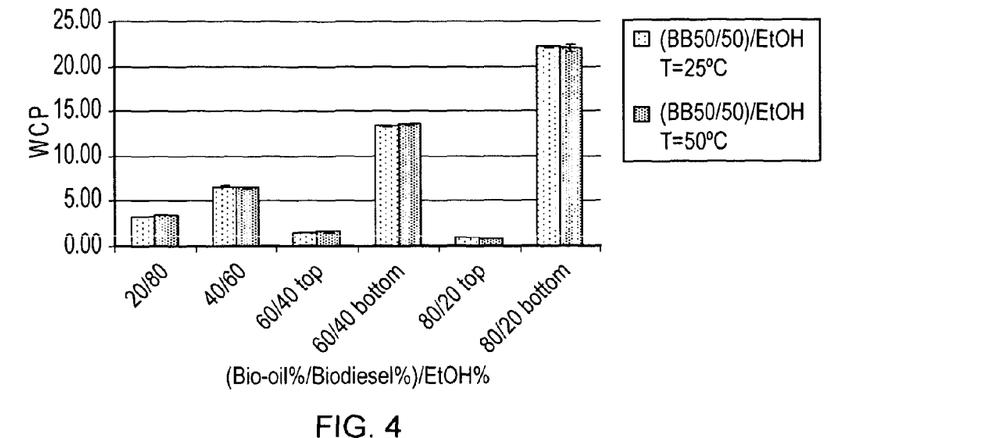
FIGS. 4 and 5 compare the water content of various samples.

FIG. 4 compares the water content of various samples. The water content in the bottom layers is more than in the top layers due to bio-oil being the main component in the bottom layers.

Blend of Bio-Oil, Bio-Diesel with 50% of Ethanol

As discussed above, this set of samples proded one homogeneous sample and three multi-phase samples.

The results in Tables 12 and 13 show that the water content depend on proportion of bio-diesel. The water content reduces when the proportion of bio-diesel reduces rather than bio-oil. It shows that the miscibility of bio-oil depends on the amount of bio-diesel. When the proportion of biodiesel increases, bio-oil dissolves in biodiesel much more. Consequently, the water content in the top layer increases.

TABLE 12

(bio-oil %/bio-diesel %)/EtOH 50% at T = 25° C.

| | Water content % | | |
|---|---|---|---|
| Ratio (w/w %) | One phase | Top layer | Bottom layer |
| 10/40 | 3.27 | — | — |
| 20/30 | — | 2.19 | 6.66 |
| 30/20 | — | 1.47 | 9.79 |
| 40/10 | — | 1.08 | 12.40 |

TABLE 13

(bio-oil %/bio-diesel %)/EtOH 50% at T = 50° C.

| | Water content % | | |
|---|---|---|---|
| Ratio (w/w %) | One phase | Top layer | Bottom layer |
| 10/40 | 3.46 | — | — |
| 20/30 | — | 2.60 | 6.61 |
| 30/20 | — | 1.73 | 10.20 |
| 40/10 | — | 1.75 | 12.95 |

In Table 13, the proportion of ethanol is constant at 50%. Therefore it has more effect on miscibility when the proportion of bio-oil is less than the proportion of biodiesel because bio-oil has more tendency to dissolve solve ethanol.

Figure 5:
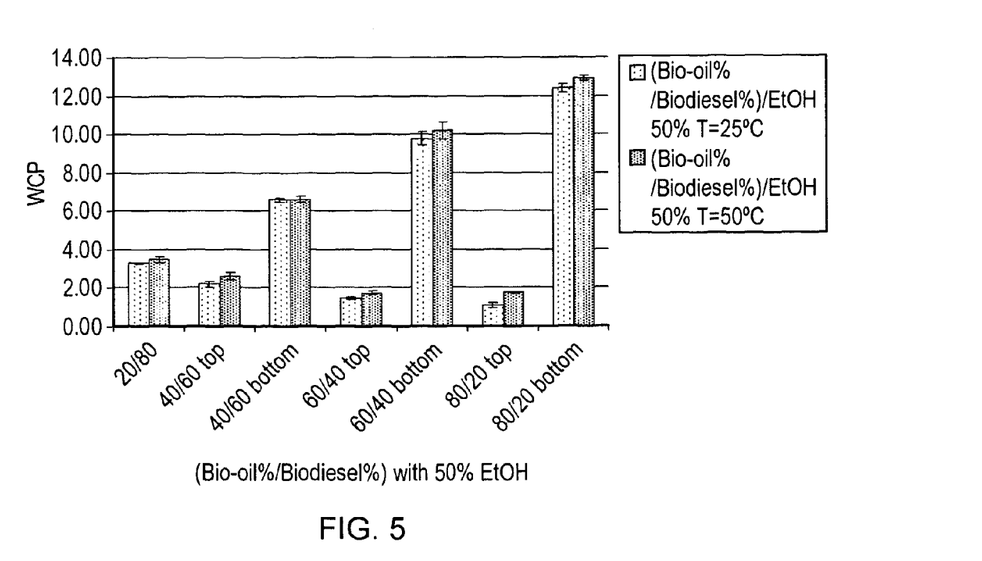

Although the effect is small, an increase in temperature tends to increase the water content. This is shown in FIG. 5.

Refractometry
Single Components

Figure 6:
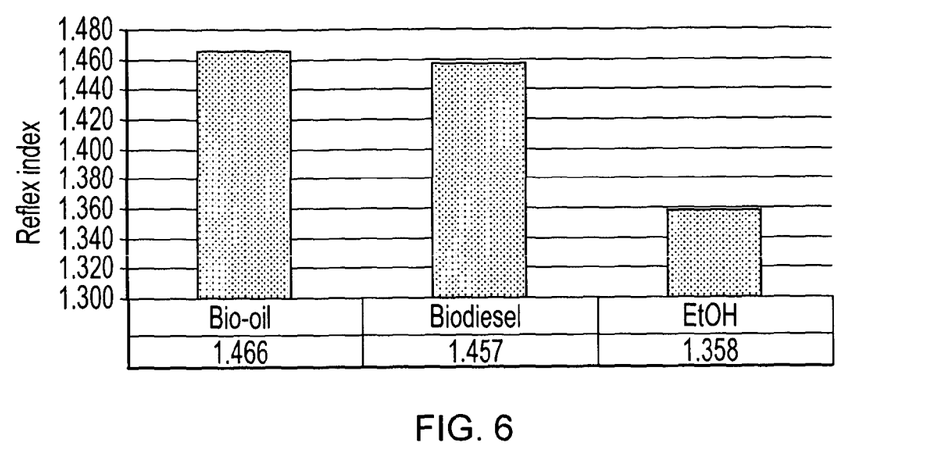
FIG. 6 shows the refractive index of the starting materials.

FIG. 6 shows the refractive index (also called hereing the "reflex" index) for the starting materials. Bio-oil has a higher refractive index than biodiesel and ethanol.

Biodiesel is oily liquid and it has refractive index that is close to bio-oil. But ethanol is pure alcohol and has a low refractive index.

Blend of Bio-Oil, Biodiesel and Ethanol with Different Ratios of Ethanol

For the samples forming a homogeneous mixture, the refractive index was measured for three part of each sample (top, middle, and bottom). All of these samples had the same refractive index in each different part, confirming the homogeneity of these samples. Here, the average of refractive index of the three parts is reported.

For samples having two phases, the refractive index was measured for both layers.

Table 14 shows refractive index for samples provided at 25° C. and 50° C. The measurement temperature was 25° C.

TABLE 14 refractive index for (bio-oil 50%/bio-diesel 50%)/EtOH %

| | Refractive index | |
|---|---|---|
| Ratio (w/w %) | T = 25° C. | T = 50° C. |
| 20/80 | 1.377 | 1.378 |
| 40/60 | 1.396 | 1.397 |
| 60/40 top | 1.440 | 1.440 |
| 60/40 bottom | 1.406 | 1.407 |
| 80/20 top | 1.449 | 1.449 |
| 80/20 bottom | 1.428 | 1.429 |

Figure 7:
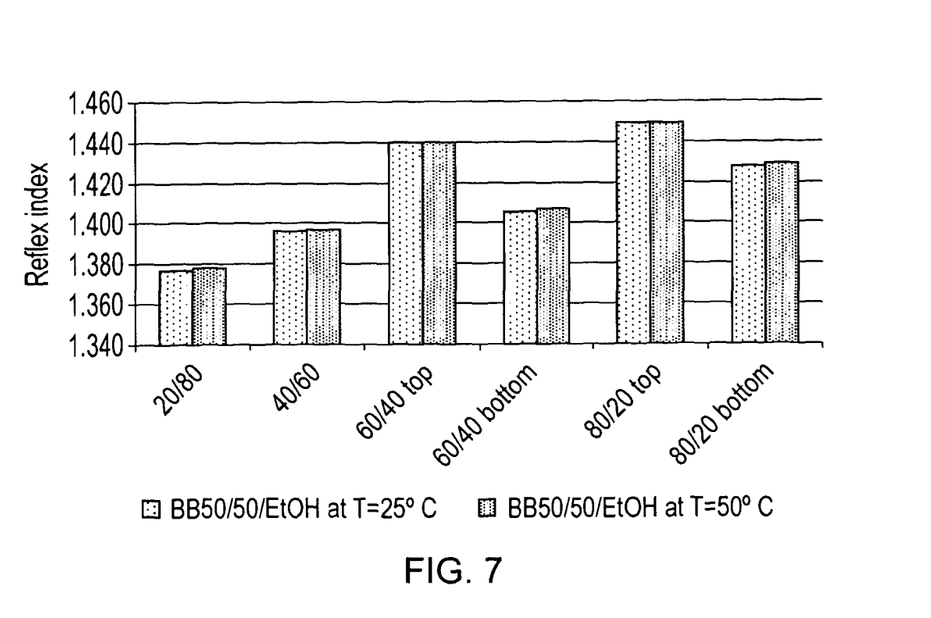
FIGS. 7 and 8 show the refractive index of various mixed samples.

The temperature does not have any significant effect on the refractive index. This is illustrated further by FIG. 7.

Blend of Bio-Oil, Bio-Diesel with 50% of Ethanol

The first sample (bio-oil 20%/bio-diesel 80%) was a single phase liquid. The refractive index was measured for three parts of it, as above. The results showed that the sample is a homogenous liquid. The average of the results for these parts reported.

The other samples were multi-phase. The refractive index was measured for both layers. Table 15 below shows the results for samples which were produced using a constant amount of ethanol.

TABLE 15 refractive index for (bio-oil %/bio-diesel %)/EtOH 50%

| | Refractive index | |
|---|---|---|
| Ratio (w/w %) | T = 25° C. | T = 50° C. |
| 10/40 | 1.406 | 1.406 |
| 20/30 top | 1.430 | 1.429 |
| 20/30 bottom | 1.403 | 1.402 |
| 30/20 top | 1.438 | 1.438 |
| 30/20 bottom | 1.402 | 1.402 |
| 40/10 top | 1.442 | 1.442 |
| 40/10 bottom | 1.406 | 1.406 |

Figure 8:
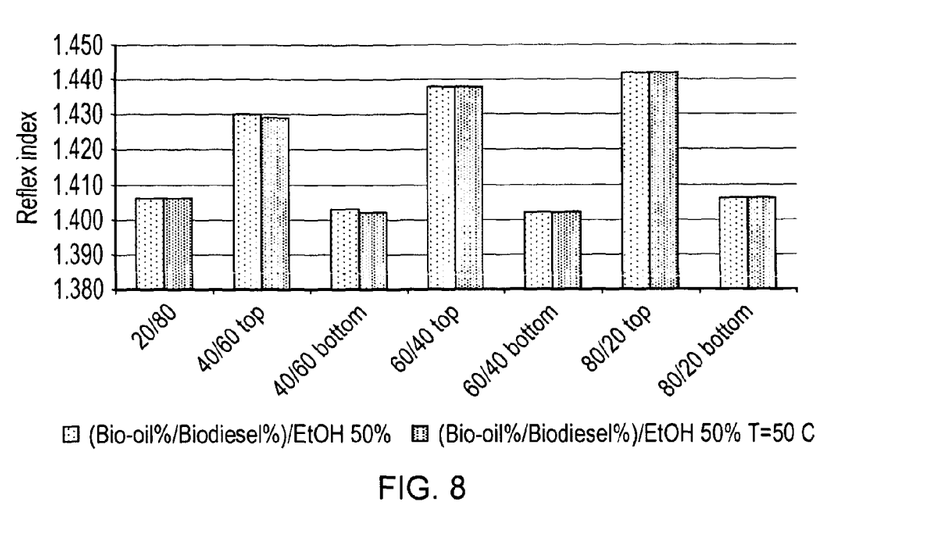

The temperature does not have any significant effect on the refractive index. This is illustrated further by FIG. 8.

The refractive index in the single phase samples is less than that of two phase sample. In addition, the major component in top layer is biodiesel with a small amount of bio-oil dissolved in it. So, the top layer should have a higher refractive index rather than pure biodiesel.

However, the refractive index in top layer is less than that of pure biodiesel. This is considered to be due to ethanol present in the top layer. On the other hand, the refractive index in the bottom layer is less than that of the top layer. This bottom layer shows the higher amount of ethanol dissolved in bio-oil.

Density
Single Components

Figure 9:
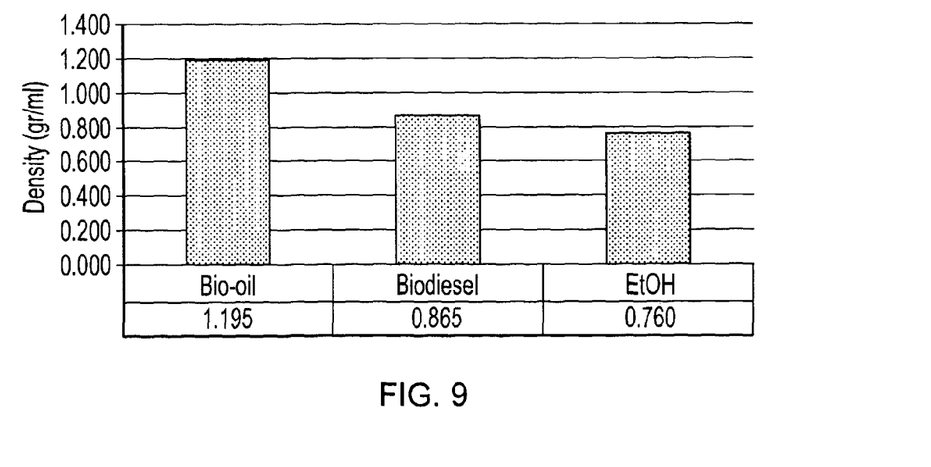
FIG. 9 shows the density results for the starting materials.

FIG. 9 shows the density results for the starting materials.

Blend of Bio-Oil, Bio-Diesel and Ethanol with Different Ratios of Ethanol

In the one phase samples, the density is less than bio-oil and bio-diesel. Also, it is more than ethanol.

There are two density measurement given for samples with two phases. In the top layer, the density is very close to bio-diesel. It illustrates the amount of bio-oil and ethanol dissolved in the bio-diesel. If bio-oil dissolved to a significant extent in bio-diesel, it should increase the density. But the density is close to pure bio-diesel or it is less than of pure bio-diesel, possibly due to ethanol dissolved in the bio-diesel.

The results for all samples appear in Tables 16 and 17 below. Table 16 shows the results for samples produced at 25° C. Table 17 shows the results for samples produced at 50° C.

TABLE 16

(bio-oil 50%/bio-diesel 50%)/EtOH % at T = 25° C.

| Ratio (w/w %) | Density (g/ml) | | |
|---|---|---|---|
| | One phase | Top layer | Bottom layer |
| 20/80 | 0.813 | — | — |
| 40/60 | 0.839 | — | — |
| 60/40 | — | 0.862 | 0.904 |
| 80/20 | — | 0.865 | 1.029 |

TABLE 17

(bio-oil 50%/bio-diesel 50%)/EtOH % at T = 50° C.

| Ratio (w/w %) | Density (g/ml) | | |
|---|---|---|---|
| | One phase | Top layer | Bottom layer |
| 20/80 | 0.824 | — | — |
| 40/60 | 0.848 | — | — |
| 60/40 | — | 0.851 | 0.915 |
| 80/20 | — | 0.864 | 1.015 |

Figure 10:
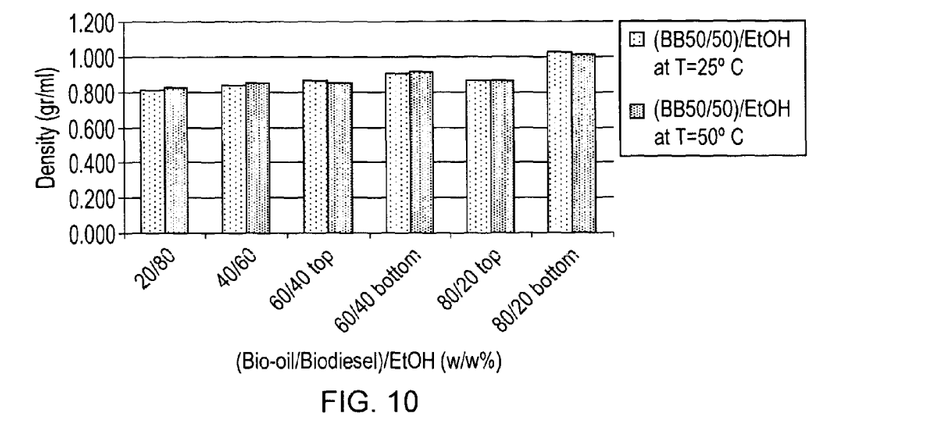
FIGS. 10 and 11 show the density results of various mixed samples.

The temperature does not have a significant effect on density. This is shown more clearly in FIG. 10.

Blend of Bio-Oil, Bio-Diesel with 50% of Ethanol

The results are shown in Table 18.

TABLE 18

(bio-oil %/bio-diesel %)/EtOH 50% at T = 25° C.

| Ratio (w/w %) | Density (g/ml) | | |
|---|---|---|---|
| | One phase | Top layer | Bottom layer |
| 10/40 | 0.851 | — | — |
| 20/30 | — | 0.885 | 0.876 |
| 30/20 | — | 1.001 | 0.920 |
| 40/10 | — | 0.907 | 0.938 |

TABLE 19

(bio-oil %/bio-diesel %)/EtOH 50% at T = 50° C.

| Ratio (w/w %) | Density (g/ml) | | |
|---|---|---|---|
| | One phase | Top layer | Bottom layer |
| 10/40 | 0.839 | — | — |
| 20/30 | — | 0.935 | 0.850 |
| 30/20 | — | 1.026 | 0.894 |
| 40/10 | — | 0.918 | 0.899 |

These results show that the density starts to increase in the bottom layers, when the ratio of bio-oil increases in the samples. However, the density has a maximum value in 30/20 (w/w %). The reason for this phenomenon could be the effect of ethanol to enhance the miscibility of bio-oil in biodiesel. At first, ethanol would like to dissolve in bio-oil. The extra ethanol may dissolve in biodiesel, after the bio-oil/ethanol mixture is saturated. Further, the ethanol helps the miscibility of bio-oil and biodiesel. Here, more ethanol dissolved in biodiesel and increase the density.

Figure 11:
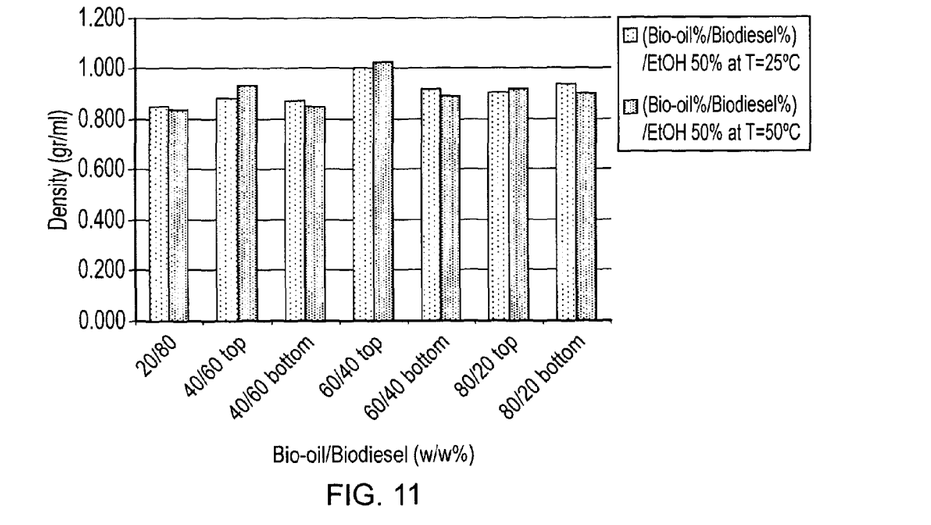

Tables 18 and 19 show the density for samples in different ratios and temperatures. The temperature appears to have a direct effect on the density. Increasing the temperature from 25° C. to 50° C. increases the density in the top layer. Conversely, the density in the bottom layer is reduced, and this is also seen in the one phase sample. FIG. 11 compares these results graphically.

Gas Chromatography

The samples were tested using GC-MS equipment. At first, bio-oil and biodiesel were measured by GC-MS. The main peaks were considered and the major components identified for each. GC-MS measurements were carried out for both layers of samples with two layers. Most compounds of biodiesel are methyl ester. The methyl esters are the main peaks in the GC-MS result for biodiesel.

The bio-oil is different, since it contains very many compounds. The main compounds in the bio-oil are listed below:
Cyclobutanol
1-propanamine, N-2-dimethyle-N-nitrose
Propanoic acid
Acetic acid
Butanoic acid, 3-hydroxy
2-cyclopenten-1-one, 2-hydroxy-3-methyl
Carbamic acid, phenyl ester
Phenol, 2-methoxy
2-acetonyl-9-[3-deoxy-beta-d-ribouranosyl]hypoxanthine
1,6,2,3-dianhydro-4-o-acetyl-beta-d-allopyranose
Phenol, 4-methoxy-3-methyl
Hexanoic acid, 3-hydroxy, methyl ester
Phenol, 4-ethyl-2-methoxy
2,3-anhydro-d-galactosan
2-penten, 1-pentyloxy
2-methoxy-4-vinylphenol
Hexanoic acid, hydroxyl, methyl ester
Phenol, 2,6-dimethoxy
2H-pyran, tetrahydro-2-(1-methylethoxy)
1-boromo-3,7-dimethyloctane
Pentadecanoic acid, 3-oxo-methyl ester
Cyclopenta[c]fore[2,3-H]benzopyran
Ethanol, 1-[4-hydroxy-3-methoxyphenyl]
2-propanon, 1-[4-hydroxy-3-methoxyphenyl]
D-allose
Curan-17-oic acid, 19-(acetyloxy)-2,16-didehydro-20-hydroxy methyl ester
Ethanone, 1-(4-hydroxy-3,5-dimethoxyphenyl)
11-octadecenaic acid, methyl ester
2-2-methylenebis[6-(1,1-dimethyle)-4-ethyl]
DL-3,4-dimethyl-3,4-hexanediol
1,2,3-propanetriol, monoacetate
3-deoxy-d-mannoic lacton
Ethanol, 2-propoxy The other GC results showed some part of bio-diesel dissolved into bottom layer or bio-oil. These components are mainly methyl ester. In addition, the results for top layer show the main component is bio-diesel with a small amount of bio-oil.

Based on the GC-MS observations, part of the bio-diesel is miscible in the bio-oil in the presence of ethanol. It appears that the ethanol helps with the miscibility of bio-oil and bio-diesel.

CONCLUSIONS

The miscibility of the bio-oil based fuel blends disclosed herein depends on the amount of bio-diesel and ethanol.

Ethanol is a good agent to increase miscibility of bio-oil and bio-diesel. When 50% or more of ethanol is added to blend of bio-oil and bio-diesel (10% bio-oil/10% bio-diesel, 20% bio-oil/20% bio-diesel and 10% bio-oil/40% bio-diesel), the result was a homogeneous liquid.

Further, when the ratio of bio-oil was more than 20% in the samples, the samples were two phase liquids.

Ethanol is the main factor in determining the miscibility of bio-oil and bio-diesel. An amount of bio-diesel always dissolves in bio-oil in presence of ethanol. When the amount of ethanol increases in the sample, the solubility of biodiesel in bio-oil will increase. However, miscibility of bio-oil in bio-diesel does not solely depend on the amount of ethanol, because a small amount of bio-oil dissolves in bio-diesel without ethanol—ethanol has the effect of increasing miscibility bio-oil in bio-diesel.

It seems that some properties of bio-diesel change after mixing with bio-oil and ethanol. The water content increases after such blending. The main reason is amount of water that comes from the bio-oil. In addition, the pH of bio-diesel changes. According to results from GC-MS and pH and water content, the water and some acids (Pentadecanoic acid, Hexanoic acid and etc) from bio-oil dissolve in bio-diesel and change the pH of top layer of biodiesel. However, there is not a great change in refractive index and density.

This study has been carried out at 25° C. (room temperature) and at 50° C. The temperature had little effect on the results and properties of the fuel blends.

Overall, bio-oil and bio-diesel are not miscible together to a useful extent. Bio-oil dissolves in bio-diesel only in small quantities. However, ethanol as a polar chemical and a good solvent for bio-oil and biodiesel can affect the miscibility. After adding the ethanol, the bio-diesel can dissolve in bio-oil. The water, acids and the compounds with high molecular weight from bio-oil dissolve in bio-diesel. Additionally, there is no evidence (based on GC-MS results) of significant chemical reaction between the components that are mixed.

The preferred embodiments of the invention have been described by way of example. Modifications of these embodiments, further embodiments and modifications thereof will be apparent to the skilled person and as such are within the scope of the invention.

All references cited herein are hereby incorporated by reference in their entirety and for all purposes.

The invention claimed is:

1. A liquid bio-fuel mixture comprising:
   a liquid condensate product of biomass fast pyrolysis;
   a bio-diesel component;
   an ethanol component;
   wherein the liquid bio-fuel mixture is macroscopically single phase.

2. A liquid bio-fuel mixture according to claim 1 wherein the mixture is macroscopically single phase at room temperature.

3. A liquid bio-fuel mixture according to claim 1 wherein: the liquid condensate product of biomass fast pyrolysis is represented as BO, the wt % of BO being x; the bio-diesel component is represented as BD, the wt % of BD being y; and the ethanol component is represented as EtOH, the wt % of EtOH being z, the composition of the mixture thereby being representable as (BO)x(BD)y(EtOH)z, wherein on a ternary phase diagram having three axes, each axis defining respectively the wt % of BO, BD, and EtOH, the mixture having a composition defined by a macroscopic single phase region of the phase diagram, said region enclosed at least by a polygon having vertices defined by values for (x, y, z) of: (0, 15, 85), (5, 57, 38), (8, 46, 46), (13, 35, 52), (20, 24, 56), (30, 12, 58), (40, 7, 53), (50, 5, 45), (60, 4, 36), (95, 1, 4), and (0, 1, 99).

4. A liquid bio-fuel mixture according to claim 3 wherein said macroscopic single phase region of the phase diagram is enclosed at least by a polygon having vertices defined by values for (x, y, z) of: (5, 57, 38), (8, 46, 46), (13, 35, 52), (20, 24, 56), (30, 12, 58), (40, 7, 53), (50, 5, 45), (60, 4, 36), and (5, 3, 92).

5. A liquid bio-fuel mixture according to claim 3 wherein said macroscopic single phase region of the phase diagram is enclosed at least by a polygon having vertices defined by values for (x, y, z) of: (8, 46, 46), (13, 35, 52), (20, 24, 56), (30, 12, 58), (40, 7, 53), (50, 5, 45), (60, 4, 36), and (8, 6, 86).

6. A liquid bio-fuel mixture according to claim 3 wherein the mixture contains at least 10 wt % of the liquid condensate product of biomass fast pyrolysis.

7. A liquid bio-fuel mixture according to claim 3 wherein the mixture contains at least 15 wt % of the liquid condensate product of biomass fast pyrolysis.

8. A liquid bio-fuel mixture according to claim 3 wherein said macroscopic single phase region of the phase diagram is enclosed at least by a polygon having vertices defined by values for (x, y, z) of: (0, 50, 50), (20, 20, 60) and (10, 10, 80).

9. A liquid bio-fuel mixture according to claim 1 wherein the liquid condensate product of biomass pyrolysis is itself macroscopically single phase.

10. A liquid bio-fuel mixture according to claim 1 wherein the liquid condensate product of biomass pyrolysis contains at least 10 wt % water.

11. A liquid bio-fuel mixture according to claim 1 wherein the liquid condensate product of biomass fast pyrolysis contains at most 40 wt % water.

12. A liquid bio-fuel mixture according to claim 1 further comprising at least 5 wt % petrodiesel.

13. A liquid bio-fuel mixture comprising:
   at least 15% by weight of the bio-fuel mixture of a liquid condensate product of biomass fast pyrolysis, comprising between 10 and 40% water;
   a bio-diesel component;
   an ethanol component;
   wherein the liquid condensate product of biomass fast pyrolysis is represented as BO, the wt % of BO being x; the bio-diesel component is represented as BD, the wt % of BD being y; and the ethanol component is represented as EtOH, the wt % of EtOH being z, the composition of the mixture thereby being representable as (BO)x(BD)y(EtOH)z, wherein on a ternary phase diagram having three axes, each axis defining respectively the wt % of BO, BD, and EtOH, the mixture having a composition defined by a macroscopic single phase region of the phase diagram, said region enclosed by a polygon having vertices defined by values for (x, y, z) of: (0, 15, 85), (5, 57, 38), (8, 46, 46), (13, 35, 52), (20, 24, 56), (30, 12, 58), (40, 7, 53), (50, 5, 45), (60, 4, 36), (95, 1, 4), and (0, 1, 99).

14. A method for the production of energy comprising:
   combustion of a liquid biofuel composition comprising:
   a liquid condensate product of biomass fast pyrolysis;
   a bio-diesel component;
   an ethanol component;
   wherein the liquid condensate product of biomass fast pyrolysis is represented as BO, the wt % of BO being x; the bio-diesel component is represented as BD, the wt % of BD being y; and the ethanol component is represented as EtOH, the wt % of EtOH being z, the composition of the mixture thereby being representable as (BO)x(BD)y(EtOH)z, wherein on a ternary phase diagram having three axes, each axis defining respectively the wt % of BO, BD, and EtOH, the mixture having a composition defined by a macroscopic single phase region of the phase diagram, said region enclosed by a polygon having vertices defined by values for (x, y, z) of: (0, 15, 85), (5, 57, 38), (8, 46, 46), (13, 35, 52), (20, 24, 56), (30, 12, 58), (40, 7, 53), (50, 5, 45), (60, 4, 36), (95, 1, 4), and (0, 1, 99).

15. The method of claim 14 wherein the combustion results in the generation of one or more of: heat, electrical power and mechanical power.

* * * * *